United States Patent
Sun et al.

(10) Patent No.: US 11,745,236 B2
(45) Date of Patent: Sep. 5, 2023

(54) STRIP FLATNESS PREDICTION METHOD CONSIDERING LATERAL SPREAD DURING ROLLING

(71) Applicant: Northeastern University, Shenyang (CN)

(72) Inventors: Jie Sun, Shenyang (CN); Qinglong Wang, Shenyang (CN); Pengfei Shan, Shenyang (CN); Zhen Wei, Shenyang (CN); Wen Peng, Shenyang (CN); Jingguo Ding, Shenyang (CN); Dianhua Zhang, Shenyang (CN)

(73) Assignee: Northeastern University, Shenyang (CN)

( * ) Notice: Subject to any disclaimer, the term of this patent is extended or adjusted under 35 U.S.C. 154(b) by 305 days.

(21) Appl. No.: 17/112,389

(22) Filed: Dec. 4, 2020

(65) Prior Publication Data
US 2021/0260634 A1   Aug. 26, 2021

(30) Foreign Application Priority Data
Dec. 6, 2019  (CN) .......................... 201911239827.7

(51) Int. Cl.
*G06F 30/23* (2020.01)
*B21B 37/28* (2006.01)
(Continued)

(52) U.S. Cl.
CPC .............. *B21B 37/28* (2013.01); *G06F 30/23* (2020.01); *G06F 30/25* (2020.01); *G06F 30/367* (2020.01);
(Continued)

(58) Field of Classification Search
CPC ......... B21B 37/28; G06F 30/23; G06F 30/25; G06F 30/367; G06F 30/398; G06F 2111/00; G06F 2119/22
See application file for complete search history.

(56) References Cited

U.S. PATENT DOCUMENTS

| 7,823,428 B1 * | 11/2010 | Malik ..................... B21B 37/28 72/8.9 |
| 2003/0178108 A1 * | 9/2003 | Sundgren ................ B23P 15/00 148/527 |

(Continued)

OTHER PUBLICATIONS

W. Tao, X. Hong, Z. Tie-yong, Q. Xiang-Dong, "Improvement of 3-D FEM Coupled Model on Strip Crown in Hot Rolling", ScienceDirect, pp. 14-19, 2012 (Year: 2012).*

*Primary Examiner* — Kibrom K Gebresilassie
(74) *Attorney, Agent, or Firm* — RAY QUINNEY & NEBEKER P.C.; Paul N. Taylor

(57) ABSTRACT

The present disclosure provides a strip flatness prediction method considering lateral spread during rolling. The method includes: step 1: acquiring strip parameters, roll parameters and rolling process parameters; step 2: introducing a change factor of a lateral thickness difference before and after rolling and a lateral spread factor by considering lateral metal flow, and constructing a strip flatness prediction model based on the coupling of flatness, crown and lateral spread; step 3: constructing a three-dimensional (3D) finite element model (FEM) of a rolling mill and a strip, simulating strip rolling by the 3D FEM, extracting lateral displacement and thickness data of the strip during a stable rolling stage, calculating parameters of the strip flatness prediction model based on the coupling of flatness, crown and lateral spread; and step 4: predicting the flatness of the strip by the strip flatness prediction model based on the coupling of flatness, crown and lateral spread.

2 Claims, 12 Drawing Sheets

(51) Int. Cl.
  *G06F 119/22* (2020.01)
  *G06F 30/25* (2020.01)
  *G06F 30/398* (2020.01)
  *G06F 111/00* (2020.01)
  *G06F 30/367* (2020.01)

(52) U.S. Cl.
  CPC ........ *G06F 30/398* (2020.01); *G06F 2111/00* (2020.01); *G06F 2119/22* (2020.01)

(56) References Cited

U.S. PATENT DOCUMENTS

| | | | |
|---|---|---|---|
| 2009/0282884 A1* | 11/2009 | Pawelski | B21B 37/32 |
| | | | 72/201 |
| 2010/0249973 A1* | 9/2010 | Bergsten | B21B 37/28 |
| | | | 700/154 |
| 2011/0106512 A1* | 5/2011 | Hainke | G05B 17/02 |
| | | | 703/2 |
| 2017/0259312 A1* | 9/2017 | Akashi | B21B 37/16 |
| 2017/0348745 A1* | 12/2017 | Furumoto | B21B 1/26 |

* cited by examiner

STRIP FLATNESS PREDICTION METHOD CONSIDERING LATERAL SPREAD DURING ROLLING

TECHNICAL FIELD

The present disclosure relates to the technical field of strip rolling, in particular to a strip flatness prediction method considering lateral spread during rolling.

BACKGROUND

With the continuous improvement of quality requirements for strip products, the problem of strip flatness has become increasingly prominent. At present, the thickness profile and flatness are the most important indicators to describe the quality of the strip shape. The thickness profile reflects the difference in thickness along the strip width, while the flatness reflects the difference in the extension of the strip along the length. In general, strip flatness control includes crown control and flatness control. There is a coupling relationship between crown and flatness. When the inlet strip flatness is excellent and the outlet strip flatness is required to be desirable, the geometric similarity conditions, namely the so-called principle of constant crown ratio, of good strip flatness must be observed.

The existing geometric conditions for good strip flatness introduce too many simplifications and assumptions. The traditional strip flatness prediction method based on the change of crown ratio has certain limitations, and the prediction results are often inaccurate because the influence of lateral metal flow is not considered. For example, when a narrow strip with negative crown is rolled by a flat roll, the extreme tensile stress zone does not appear at the predicted position, that is, at the edge of the strip, but at around ¼ of the strip width. In the actual rolling process, the lateral spread of the strip at various positions in the width direction is not uniform, which directly affects the elongation distribution of the longitudinal fiber strips of the outlet strip.

SUMMARY

In order to solve the problems existing in the prior art, the present disclosure provides a strip flatness prediction method considering lateral spread during rolling. The present disclosure improves the accuracy and applicability of strip flatness prediction.

The technical solution of the present disclosure is as follows:

A strip flatness prediction method considering lateral spread during rolling, including the following steps:

step 1: acquiring strip parameters, roll parameters and rolling process parameters, where the strip parameters include strip width, thickness, crown ratio, density, elastic modulus, yield strength, Poisson's ratio and tangent modulus; the roll parameters include the diameter, barrel length, density, elastic modulus and Poisson's ratio of a work roll; the rolling process parameters include friction and rolling speed;

step 2: constructing a strip flatness prediction model based on the coupling of flatness, crown and lateral spread by considering lateral metal flow;

step 3: constructing a three-dimensional (3D) finite element model (FEM) of a rolling mill and a strip according to the strip parameters, the roll parameters and the rolling process parameters, simulating strip rolling by the 3D FEM, extracting lateral displacement and thickness data of the strip during a stable rolling stage, and calculating parameters of the strip flatness prediction model based on the coupling of flatness, crown and lateral spread; and step 4: predicting the flatness of the strip by the strip flatness prediction model based on the coupling of flatness, crown and lateral spread.

Further, step 2 includes the following steps:

step 2.1: constructing a coordinate system for the strip by taking a center of the strip as an origin of coordinates and width, length and thickness directions as 3D coordinate axes; regarding the strip before rolling as an entity of continuous longitudinal fiber strips; taking a longitudinal fiber strip at a widthwise position with a distance Y from the center of the strip, and defining the width, thickness and length of the longitudinal fiber strip before rolling as dy, $H(y)$ and $L(y)$ respectively; increasing the width of the longitudinal fiber strip after rolling to $dy+[u(y+dy)-u(y)]$, reducing the thickness of the longitudinal fiber strip after rolling to $h(y)$, and increasing the length of the longitudinal fiber strip after rolling to $l(y)$, by considering lateral flow of metal particles during strip rolling, where $u(y)$ represents a lateral displacement function of the metal particles of the strip;

step 2.2: constructing a strip flatness prediction model based on the coupling of flatness, crown and lateral spread:

step 2.2.1: according to a principle of constant volume before and after rolling:

$$h(y) \cdot l(y) \cdot [dy + u(y+dy) - u(y)] = H(y) \cdot L(y) \cdot dy \qquad (1)$$

deriving the length of the longitudinal fiber strip after rolling as:

$$l(y) = \frac{H(y) \cdot L(y) \cdot dy}{h(y) \cdot [dy + u(y+dy) - u(y)]} \qquad (2)$$
$$= \frac{H(y) \cdot L(y)}{h(y) \cdot [1 + u'(y)]}$$

step 2.2.2: determining a reference length for all longitudinal fiber strips of the strip after rolling:

$$l(\bar{y}) = \frac{H(\bar{y}) \cdot L(\bar{y})}{h(\bar{y}) \cdot [1 + u'(\bar{y})]} \qquad (3)$$

where, $\bar{y}$ represents a distance of a reference longitudinal fiber strip from the center of the strip; the reference longitudinal fiber strip is a longitudinal fiber strip whose length in a lateral direction of the strip is a reference length $\bar{l}$, and the reference longitudinal fiber strip has no strip flatness defect after being rolled; the reference length $\bar{l}$ is an average length of all longitudinal fiber strips along the lateral direction of the strip;

step 2.2.3: calculating a length ratio of any longitudinal fiber strip with a distance of Y from the center of the strip to the reference longitudinal fiber strip after rolling:

$$\frac{l(y)}{l(\bar{y})} = \frac{\dfrac{H(y) \cdot L(y)}{h(y) \cdot [1+u'(y)]}}{\dfrac{H(\bar{y}) \cdot L(\bar{y})}{h(\bar{y}) \cdot [1+u'(\bar{y})]}} = \frac{L(y)}{L(\bar{y})} \cdot \frac{\dfrac{H(y)}{H(\bar{y})}}{\dfrac{h(y)}{h(\bar{y})}} \cdot \frac{1+u'(\bar{y})}{1+u'(y)} \qquad (4)$$
$$= \frac{L(y)}{L(\bar{y})} \cdot \frac{1 - \dfrac{H(\bar{y}) - H(y)}{H(\bar{y})}}{1 - \dfrac{h(\bar{y}) - h(y)}{h(\bar{y})}} \cdot \frac{1+u'(\bar{y})}{1+u'(y)}$$

step 2.2.4: calculating a longitudinal strain of the longitudinal fiber strip with a distance of Y from the center of the strip after rolling:

$$\varepsilon_{out}(y) = \frac{l(y) - l(\bar{y})}{l(\bar{y})} \quad (5)$$

$$= \frac{l(y)}{l(\bar{y})} - 1$$

$$= \frac{L(y)}{L(\bar{y})} \cdot \frac{1 - \frac{H(\bar{y}) - H(y)}{H(\bar{y})}}{1 - \frac{h(\bar{y}) - h(y)}{h(\bar{y})}} \cdot \frac{1 + u'(\bar{y})}{1 + u'(y)} - 1$$

$$= [\varepsilon_{in}(y) + 1] \cdot \frac{1 - \frac{H(\bar{y}) - H(y)}{H(\bar{y})}}{1 - \frac{h(\bar{y}) - h(y)}{h(\bar{y})}} \cdot \frac{1 + u'(\bar{y})}{1 + u'(y)} - 1$$

where, $\varepsilon_{in}(y)$ represents a longitudinal strain before rolling, $$\varepsilon_{in}(y) = \frac{L(y)}{L(\bar{y})} - 1;$$

step 2.2.5: defining a change factor of a lateral thickness difference before and after rolling as:

$$C_r = \frac{1 - \frac{H(\bar{y}) - H(y)}{H(\bar{y})}}{1 - \frac{h(\bar{y}) - h(y)}{h(\bar{y})}} \quad (6)$$

defining a lateral spread factor as:

$$T_f = \frac{1 + u'(\bar{y})}{1 + u'(y)} \quad (7)$$

obtaining the longitudinal strain of the longitudinal fiber strip after rolling as:

$$\varepsilon_{out}(y) = [\varepsilon_{in}(y) + 1] \cdot C_r \cdot T_f - 1 \quad (8)$$

step 2.2.6: calculating an outlet flatness of the strip:

$$I_{out}(y) = \varepsilon_{out}(y) / 10^{-5} \quad (9)$$

step 2.2.7: calculating a total residual tensile stress by regarding an elastic deformation of the strip caused by a tension as a plane deformation:

$$\sigma_{xx\_total}^{out}(y) = \bar{\sigma}_{out} + \sigma_{xx}^{out}(y) \quad (10)$$

where, $\bar{\sigma}_{out}$ represents an outlet reference tensile stress, and $\sigma_{xx}^{out}(y)$ represents a longitudinal residual tensile stress caused by an uneven extension of the longitudinal fiber;

$$\sigma_{xx}^{out}(y) = -\frac{E}{1 - v^2} \varepsilon_{out}(y) \quad (11)$$

then $$\sigma_{xx\_total}^{out}(y) = \bar{\sigma}_{out} - \frac{E}{1 - v^2} \varepsilon_{out}(y) \quad (12)$$

where, E and v respectively represent the elastic modulus and Poisson's ratio of the strip;

step 2.2.8: obtaining the strip flatness prediction model based on the coupling of flatness, crown and lateral spread as:

$$I_{out}(y) = \{[I_{in}(y) \cdot 10^{-5} + 1] \cdot C_r \cdot T_f - 1\} / 10^{-5} \quad (13)$$

$$\sigma_{xx\_total}^{out}(y) = \bar{\sigma}_{out} - \frac{E}{1 - v^2} \{[I_{in}(y) \cdot 10^{-5} + 1] \cdot C_r \cdot T_f - 1\}$$

where, $I_{in}(y)$ represents an inlet flatness of the strip.

Further, step 3 includes the following steps:

step 3.1: making an assumption and simplification in an FE modeling process: assuming that the rolling mill and the strip are completely symmetrical about a rolling center plane, and constructing only a simplified ½ model about an upper part of the roll and half of the strip; ignoring an elastic deformation of the roll, setting the work roll as a rigid material, and controlling the outlet cross-sectional shape and crown of the strip by changing the shape of a profile curve of the work roll; regarding a strip material as isotropic in the 3D FEM, and simulating a stress-strain behavior of the strip during deformation by using a bilinear elastoplastic isotropic hardening material model; modeling a length of strip instead of a coil of strip in the 3D FEM;

step 3.2: constructing a 3D FEM model of the rolling mill and the strip: constructing a 3D FEM model of the rolling mill and the strip by using a non-linear FE analysis program LS-DYNA according to the strip parameters, the roll parameters and the rolling process parameters, compiling an FE simulation program of the rolling mill and the strip by using ANSYS parametric design language (APDL), and compiling the FE simulation program into a macro file;

step 3.3: setting an inlet crown ratio and an outlet crown ratio of the strip to 1%, simulating strip rolling by the 3D FEM, extracting rolling force data during the simulation process, regarding a stage where a rolling force fluctuation is lower than a % as a stable rolling stage, and extracting the lateral displacement, flatness and thickness data of the strip during the stable rolling stage;

step 3.4: drawing a lateral metal flow curve of the strip by the lateral displacement data in the stable rolling stage, and fitting the lateral displacement function u(y) of the strip by a quintic polynomial function:

$$\begin{cases} u(y) = A_0 + A_1 \cdot y + A_2 \cdot y^2 + A_3 \cdot y^3 + A_4 \cdot y^4 + A_5 \cdot y^5 \\ u'(y) = A_1 + 2A_2 \cdot y + 3A_3 \cdot y^2 + 4A_4 \cdot y^3 + 5A_5 \cdot y^4 \end{cases} \quad (14)$$

where $A_0$, $A_1$, $A_2$, $A_3$, $A_4$, $A_5$ respectively represent a fitting coefficient of each item, and u'(y) represents a derivative function of the lateral displacement function u(y);

step 3.5: calculating the lateral spread factor $T_f$ by the fitted lateral displacement function u(y) according to Eq. (7), and calculating the change factor $C_r$ of the lateral thickness difference before and after rolling by the thickness data in the stable rolling stage according to Eq. (6).

The present disclosure has the following beneficial effects.

According to the principle of constant strip volume and minimal resistance during the rolling process, the present disclosure constructs a strip flatness prediction model based on the coupling of flatness, crown and lateral spread by comprehensively considering the strip flatness before rolling, the change in the lateral thickness difference during rolling and lateral metal flow, etc. Through a 3D FE simulation of strip rolling, the present disclosure fits the parameters of the prediction model. The present disclosure does not simplify the rolling process too much and only introduces a small number of assumptions, improving the prediction accuracy and applicability. The present disclosure can accurately calculate the strip flatness of any measuring point in the width direction, and quantitatively analyze the strip flatness distribution during the rolling process. The present disclosure can accurately predict the locations of various strip flatness defects, and can distinguish the types of strip flatness defects in detail, including edge waves, center buckles, one-sided edge waves, M-shaped composite waves and W-shaped composite waves.

DETAILED DESCRIPTION

The present disclosure is further described below with reference to the accompanying drawings and specific embodiments.

Figure 1:
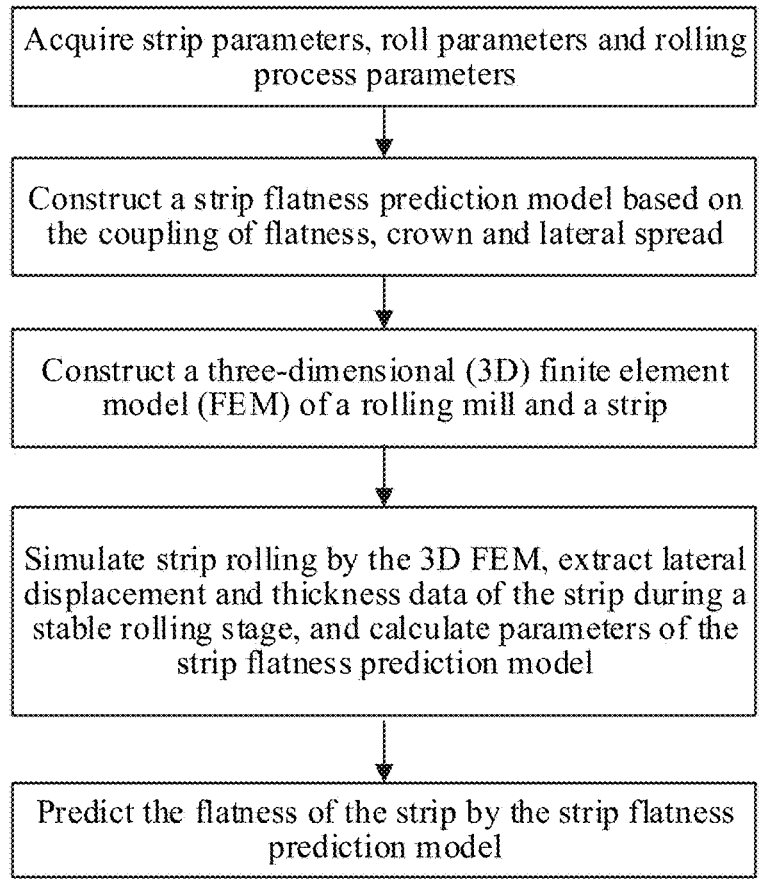
FIG. 1 is a flowchart of a strip flatness prediction method considering lateral spread during rolling according to the present disclosure.

In this embodiment, the present disclosure provides a strip flatness prediction method considering lateral spread during rolling, which is used to predict the strip flatness on a hot strip production line in China. As shown in FIG. 1, the strip flatness prediction method considering lateral spread during rolling includes the following steps:

Step 1: Acquire strip parameters, roll parameters and rolling process parameters, where the strip parameters include strip width, thickness, crown ratio, density, elastic modulus, yield strength, Poisson's ratio and tangent modulus; the roll parameters include the diameter, barrel length, density, elastic modulus and Poisson's ratio of a work roll; the rolling process parameters include friction and rolling speed.

In this embodiment, the acquired parameters are shown in Table 1.

TABLE 1

| Geometric parameters | | Process parameters of rolling | |
|---|---|---|---|
| Diameter of work roll, mm | 811.8 | Density of work roll/strip, kg/m$^3$ | 7850 |
| Barrel length of work roll, mm | 1800 | Elastic modulus of work roll/strip, GPa | 210/117 |
| Profile curve of work roll | Quadratic parabola | Poisson's ratio of work roll/strip | 0.3/0.362 |
| Length of strip sample before rolling, mm | 500 | Yield strength of strip, MPa | Steel grade related |
| Inlet width of strip, mm | Set as per steel grade | Tangent modulus of strip, MPa | 22.8 |
| Inlet thickness of strip, mm | Set as per steel grade | Friction (coulom) | $\mu = 0.256$ |
| Inlet crown ratio of strip | 1% | Rolling speed, m/sec | 2.0295 |

Step 2: Construct a strip flatness prediction model based on the coupling of flatness, crown and lateral spread by considering lateral metal flow.

Figure 2:
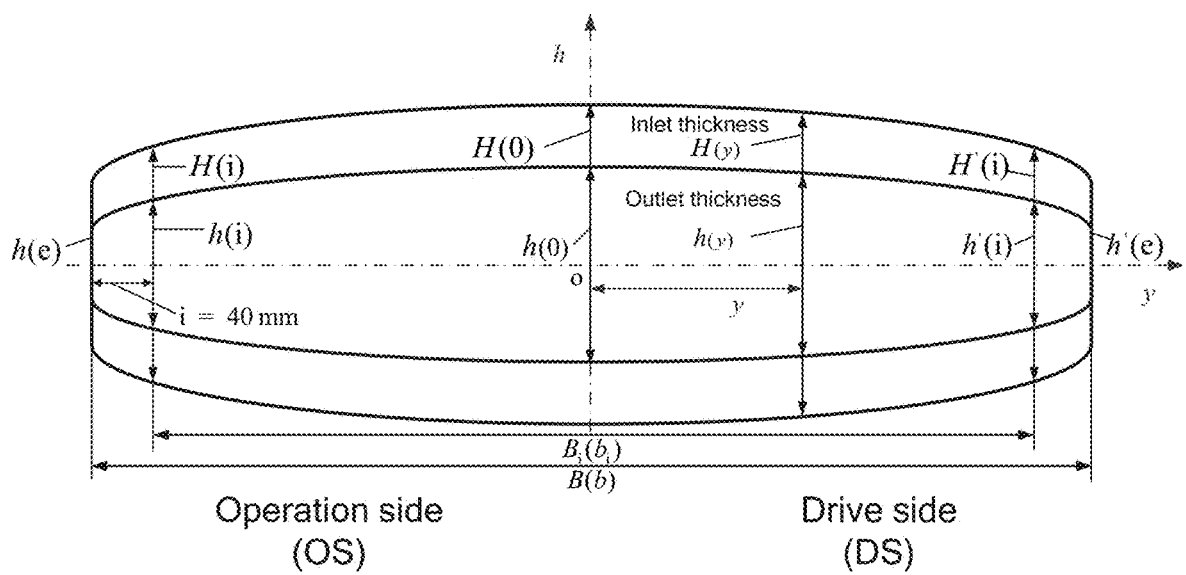
FIG. 2 shows a typical cross-sectional profile of the strip according to a specific implementation of the present disclosure.
Figure 3:
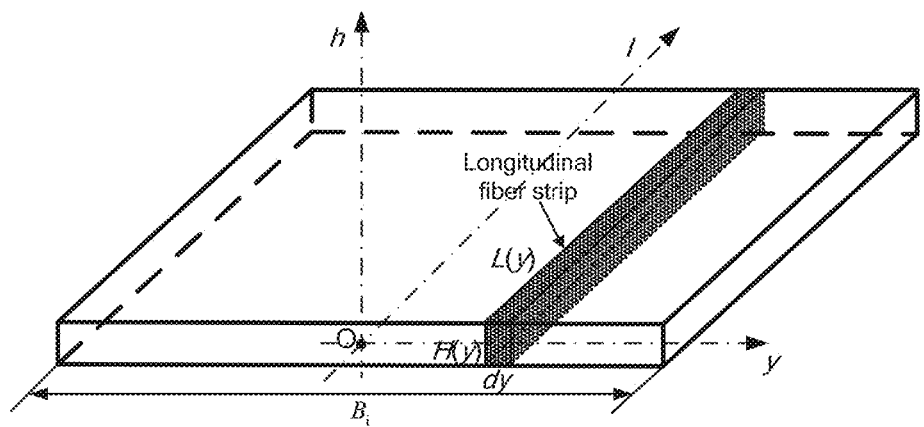
FIG. 3 shows a coordinate system of a strip according to a specific implementation of the present disclosure.
Figure 4:
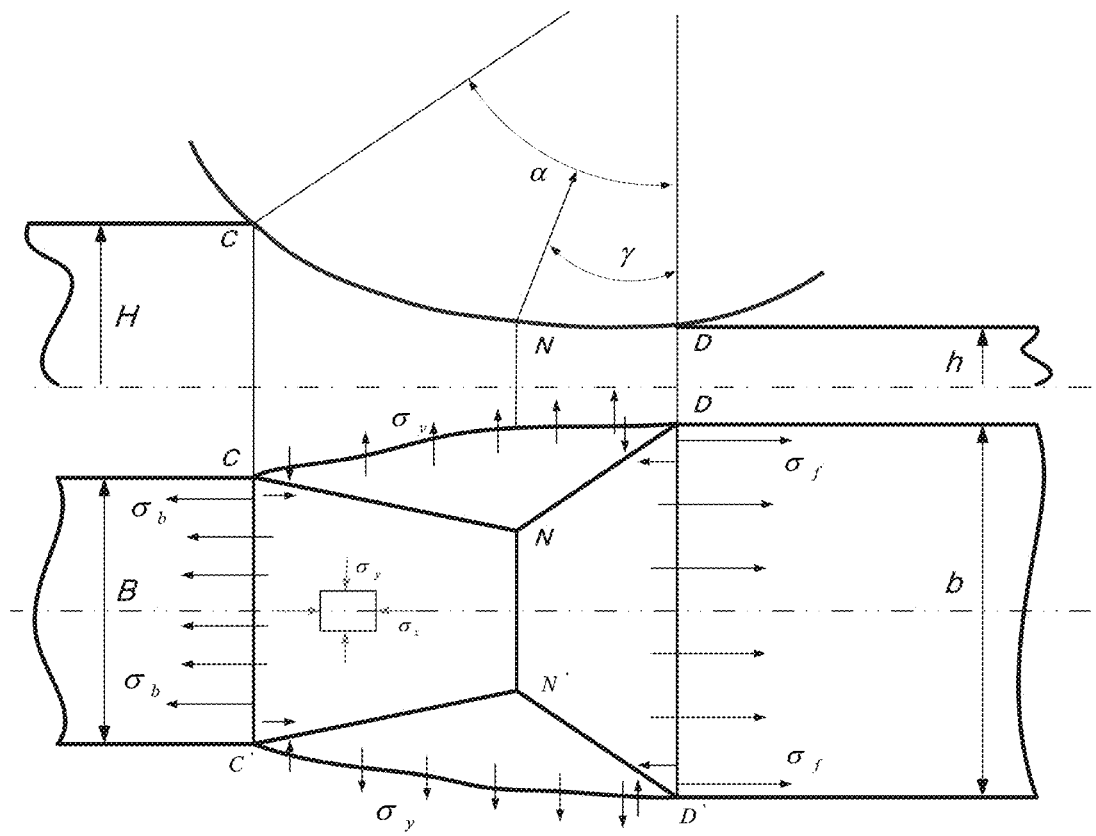
FIG. 4 shows lateral metal flow during a strip rolling process according to a specific implementation of the present disclosure.

Step 2.1: Construct a coordinate system for the strip by taking a center of a strip as an origin of coordinates and width, length and thickness directions as three-dimensional (3D) coordinate axes; regard the strip before rolling as an entity of continuous longitudinal fiber strips; take a longitudinal fiber strip at a widthwise position with a distance Y from the center of the strip, and define the width, thickness and length of the longitudinal fiber strip before rolling as dy, H(y) and L(y) respectively; increase the width of the longitudinal fiber strip after rolling to dy+[u(y+dy)−u(y)], reduce the thickness of the longitudinal fiber strip after rolling to h(y), and increase the length of the longitudinal fiber strip after rolling to l(y) by considering lateral flow (lateral spread) of metal particles during strip rolling, where u(y) represents a lateral displacement function of the metal particles of the strip. FIG. 2 shows a typical cross-sectional profile of the strip, FIG. 3 shows the coordinate system, and FIG. 4 shows the lateral metal flow.

Step 2.2: Construct a strip flatness prediction model based on the coupling of flatness, crown and lateral spread.

Step 2.2.1: According to a principle of constant flow rate per second during strip rolling, that is, a principle of constant volume before and after rolling:

$$h(y) \cdot l(y) \cdot [dy + u(y+dy) - u(y)] = H(y) \cdot L(y) \cdot dy \quad (1)$$

derive the length of the longitudinal fiber strip after rolling as:

$$l(y) = \frac{H(y) \cdot L(y) \cdot dy}{h(y) \cdot [dy + u(y+dy) - u(y)]} \quad (2)$$
$$= \frac{H(y) \cdot L(y)}{h(y) \cdot [1 + u'(y)]}$$

Step 2.2.2: Determine a reference length for all longitudinal fiber strips of the strip after rolling:

$$l(\bar{y}) = \frac{H(\bar{y}) \cdot L(\bar{y})}{h(\bar{y}) \cdot [1 + u'(\bar{y})]} \quad (3)$$

Figure 5:
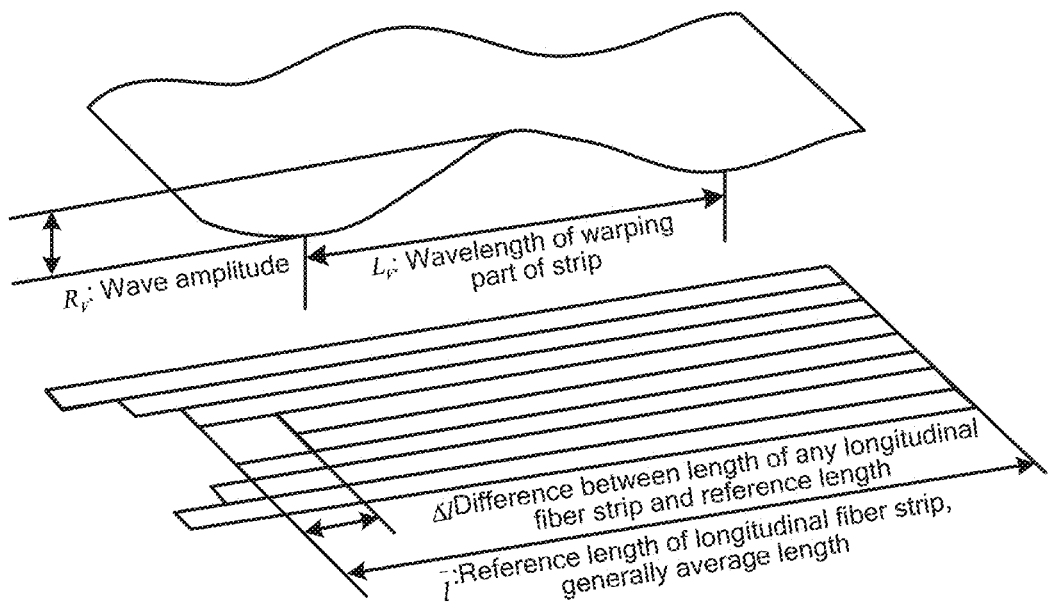
FIG. 5 shows a relationship between a strip flatness defect and a difference of a longitudinal fiber strip and a reference longitudinal fiber strip according to a specific implementation of the present disclosure.

In the equation, $\bar{y}$ represents a distance of a reference longitudinal fiber strip from the center of the strip. As shown in FIG. 5, the reference longitudinal fiber strip is a longitudinal fiber strip whose length in a lateral direction of the strip is the reference length $\bar{l}$, and the reference longitudinal fiber strip has no strip flatness defect after being rolled. The reference length $\bar{l}$ is an average length of all longitudinal fiber strips along the lateral direction of the strip.

Step 2.2.3: Calculate a length ratio of any longitudinal fiber strip with a distance of Y from the center of the strip to the reference longitudinal fiber strip after rolling:

$$\frac{l(y)}{l(\bar{y})} = \frac{\frac{H(y) \cdot L(y)}{h(y) \cdot [1+u'(y)]}}{\frac{H(\bar{y}) \cdot L(\bar{y})}{h(\bar{y}) \cdot [1+u'(\bar{y})]}} = \frac{L(y)}{L(\bar{y})} \cdot \frac{\frac{H(y)}{H(\bar{y})}}{\frac{h(y)}{h(\bar{y})}} \cdot \frac{1+u'(\bar{y})}{1+u'(y)} \quad (4)$$

$$= \frac{L(y)}{L(\bar{y})} \cdot \frac{1 - \frac{H(\bar{y}) - H(y)}{H(\bar{y})}}{1 - \frac{h(\bar{y}) - h(y)}{h(\bar{y})}} \cdot \frac{1+u'(\bar{y})}{1+u'(y)}$$

Step 2.2.4: Calculate a longitudinal strain of the longitudinal fiber strip with a distance of Y from the center of the strip after rolling:

$$\varepsilon_{out}(y) = \frac{l(y) - l(\bar{y})}{l(\bar{y})} \quad (5)$$

$$= \frac{l(y)}{l(\bar{y})} - 1$$

$$= \frac{L(y)}{L(\bar{y})} \cdot \frac{1 - \frac{H(\bar{y}) - H(y)}{H(\bar{y})}}{1 - \frac{h(\bar{y}) - h(y)}{h(\bar{y})}} \cdot \frac{1+u'(\bar{y})}{1+u'(y)} - 1$$

$$= [\varepsilon_{in}(y) + 1] \cdot \frac{1 - \frac{H(\bar{y}) - H(y)}{H(\bar{y})}}{1 - \frac{h(\bar{y}) - h(y)}{h(\bar{y})}} \cdot \frac{1+u'(\bar{y})}{1+u'(y)} - 1$$

where, $\varepsilon_{in}(y)$ represents a longitudinal strain before rolling, $$\varepsilon_{in}(y) = \frac{L(y)}{L(\bar{y})} - 1.$$

Step 2.2.5: Define a change factor of a lateral thickness difference before and after rolling as:

$$C_r = \frac{1 - \frac{H(\bar{y}) - H(y)}{H(\bar{y})}}{1 - \frac{h(\bar{y}) - h(y)}{h(\bar{y})}} \quad (6)$$

define a lateral spread factor as:

$$T_f = \frac{1 + u'(\bar{y})}{1 + u'(y)} \quad (7)$$

obtain the longitudinal strain of the longitudinal fiber strip after rolling as:

$$\varepsilon_{out}(y) = [\varepsilon_{in}(y)+1] \cdot C_r \cdot T_f - 1 \quad (8)$$

Step 2.2.6: Calculate an outlet flatness of the strip:

$$I_{out}(y) = \varepsilon_{out}(y)/10^{-5} \quad (9)$$

Figure 6:
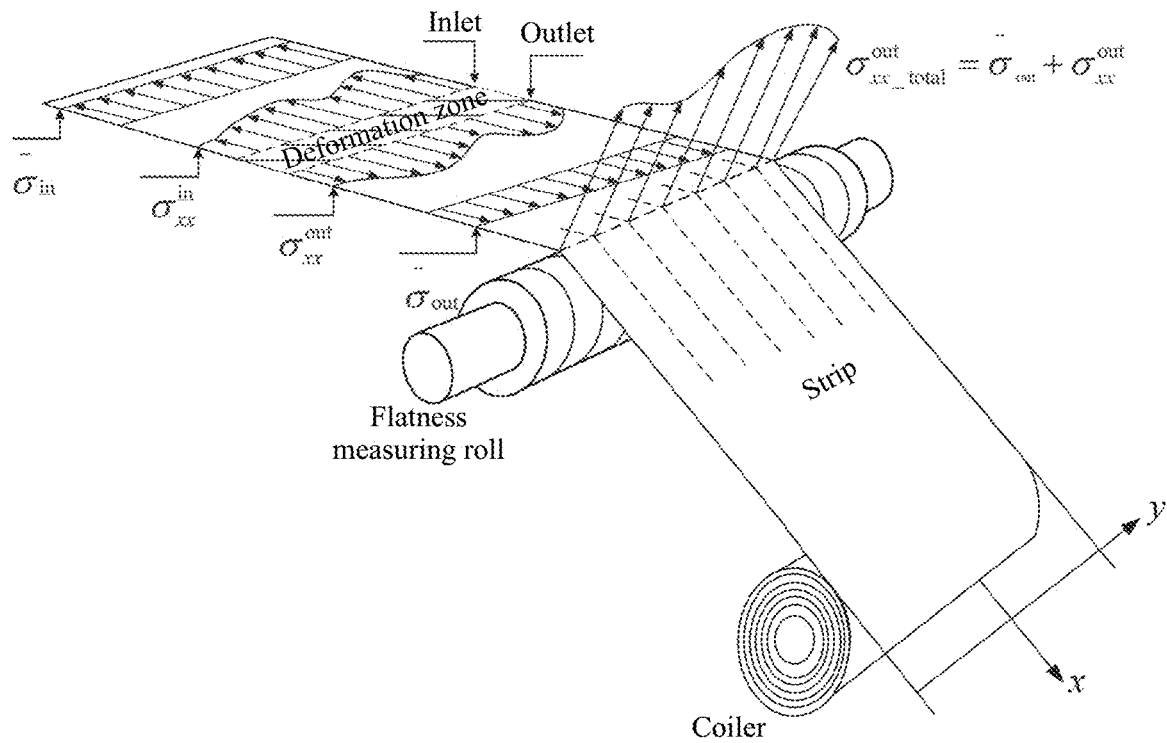
FIG. 6 shows a flatness measuring roll measuring a potential strip flatness defect on line according to a specific implementation of the present disclosure.

Step 2.2.7: Calculate a total residual tensile stress, that is, a potential strip flatness defect by regarding an elastic deformation of the strip caused by a tension as a plane deformation (FIG. 6):

$$\sigma_{xx\_total}^{out}(y) = \bar{\sigma}_{out} + \sigma_{xx}^{out}(y) \quad (10)$$

where, $\bar{\sigma}_{out}$ represents an outlet reference tensile stress, and $\sigma_{xx}^{out}(y)$ represents a longitudinal residual tensile stress caused by an uneven extension of the longitudinal fiber;

$$\sigma_{xx}^{out}(y) = -\frac{E}{1-v^2} E_{out}(y) \quad (11)$$

then $$\sigma_{xx\_total}^{out}(y) = \bar{\sigma}_{out} - \frac{E}{1-v^2} \varepsilon_{out}(y) \quad (12)$$

where, E and V respectively represent the elastic modulus and Poisson's ratio of the strip.

Step 2.2.8: Obtain the strip flatness prediction model based on the coupling of flatness, crown and lateral spread as:

$$I_{out}(y) = \{[I_{in}(y) \cdot 10^{-5} + 1] \cdot C_r \cdot T_f - 1\}/10^{-5} \quad (13)$$

$$\sigma_{xx\_total}^{out}(y) = \bar{\sigma}_{out} - \frac{E}{1-v^2}\{[I_{in}(y) \cdot 10^{-5} + 1] \cdot C_r \cdot T_f - 1\}$$

where, $I_{in}(y)$ represents an inlet flatness of the strip.

The strip flatness prediction model based on the coupling of flatness, crown and lateral spread is a mathematical model that considers lateral metal flow. The model gives a conversion relationship between the lateral thickness profile and flatness distribution of the strip, which can be used to indirectly calculate strip flatness defects off line. The off-line measurement of strip thickness is easy to operate, and the accuracy is guaranteed. The change factor $C_r$ of the lateral thickness difference before and after rolling can be calculated by measuring the lateral thickness distribution of the strip before and after rolling. The lateral spread factor $T_f$ can be calculated by analytical and numerical methods. In addition, when calculating the flatness of a thin strip, the influence of the lateral metal flow on the flatness of the strip is negligible, that is, $T_f$ is 1.

Step 3: Construct a 3D finite element model (FEM) of a rolling mill and the strip according to the strip parameters, the roll parameters and the rolling process parameters, simulate strip rolling by the 3D FEM, extract lateral displacement and thickness data of the strip during a stable rolling stage, and calculate parameters of the strip flatness prediction model based on the coupling of flatness, crown and lateral spread.

Step 3.1: Make an assumption and simplification in an FE modeling process: assume that the rolling mill and the strip are completely symmetrical about a rolling center plane, and construct only a simplified ½ model about an upper part of the roll and half of the strip; ignore an elastic deformation of the roll, set the work roll as a rigid material, and control the outlet cross-sectional shape and crown of the strip by changing the shape of a profile curve of the work roll, where in an actual rolling process, the strip undergoes an elastoplastic deformation in a roll gap; regard a strip material as isotropic in the 3D FEM; simulate a stress-strain behavior of the strip during deformation by using a bilinear elastoplastic isotropic hardening material model; model a length of strip (500 mm) instead of a coil of strip in the 3D FEM.

Figure 7:
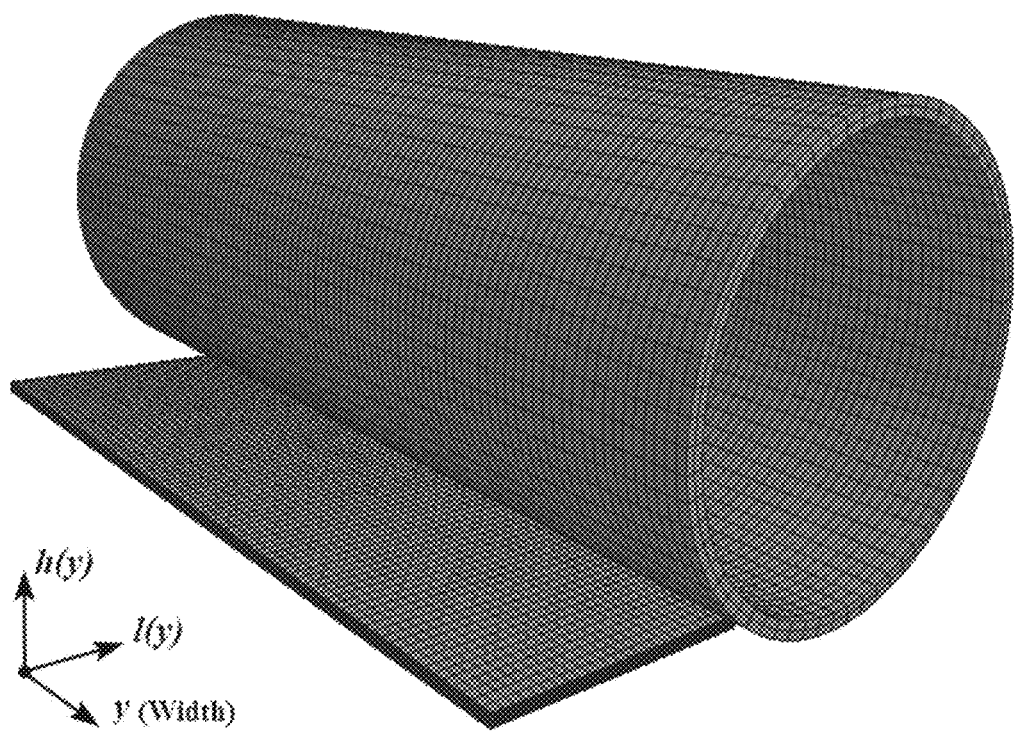
FIG. 7 shows a three-dimensional (3D) finite element model (FEM) of a rolling mill and a strip according to a specific implementation of the present disclosure.

Step 3.2: Construct a 3D FEM model of the rolling mill and the strip: construct a 3D FEM model (FIG. 7) of the rolling mill and the strip by using a non-linear FE analysis program LS-DYNA according to the strip parameters, the roll parameters and the rolling process parameters, compile an FE simulation program of the rolling mill and the strip by using ANSYS parametric design language (APDL), and compile the FE simulation program into a macro file.

Step 3.3: Set an inlet crown ratio of the strip and a crown ratio of the work roll with a roll profile to −1%, that is, set an outlet crown ratio of the strip to 1%, simulate strip rolling by the 3D FEM, extract rolling force data during the simulation process, regard a stage where a rolling force fluctuation is lower than a % as a stable rolling stage, and extract the lateral displacement, flatness and thickness data of the strip during the stable rolling stage. This step aims to meet geometric conditions of the strip flatness prediction model for the strip to maintain a good flatness under general conditions and to ensure a constant crown ratio of the strip during the rolling process. In this embodiment, a=3.

Figure 8:
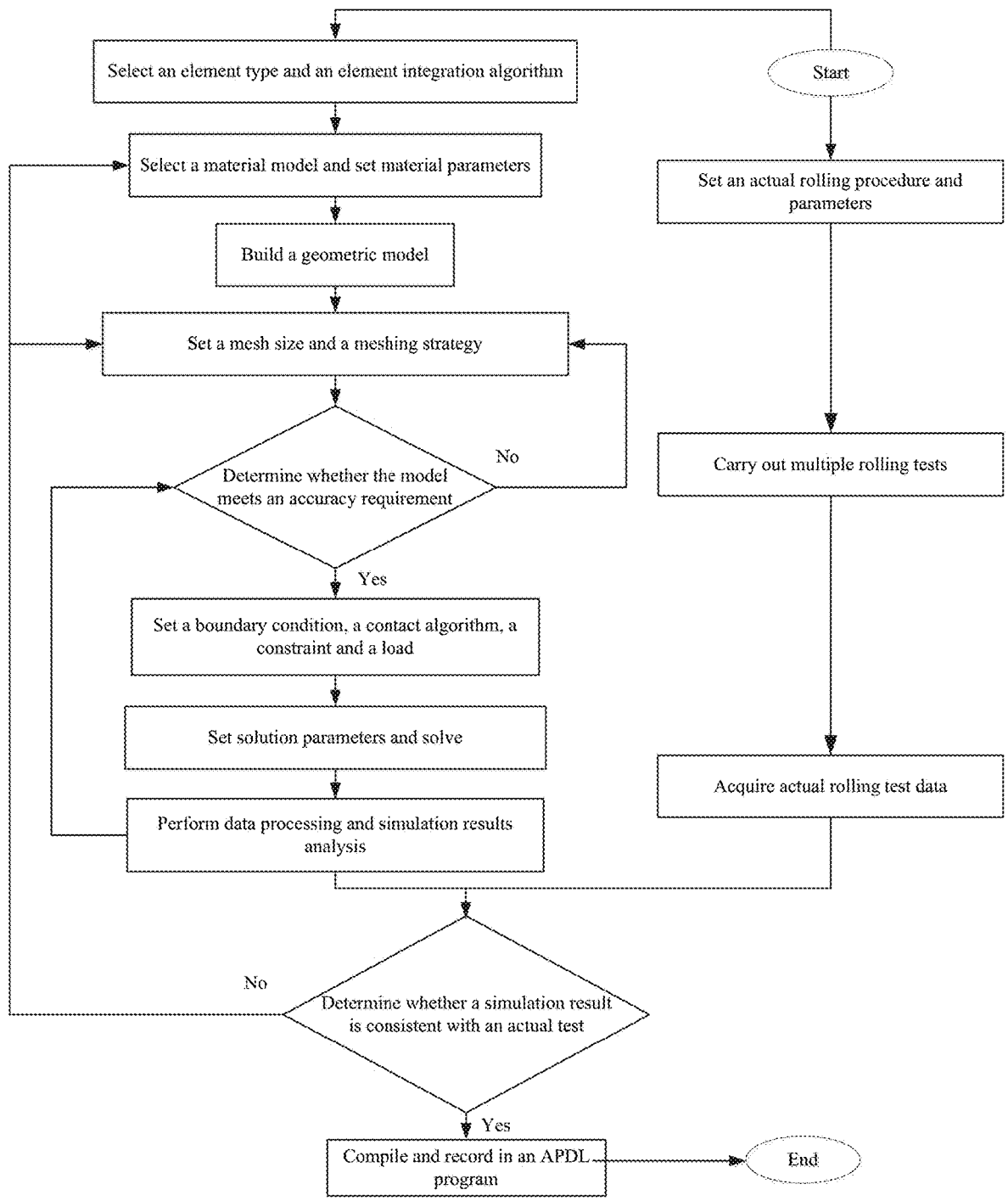
FIG. 8 shows a flowchart of construction and verification of an FEM for a strip rolling process according to a specific implementation of the present disclosure.

FIG. 8 shows a flowchart of construction and verification of the FEM. The strip first moves to a roll gap at a suitable initial speed. When the strip touches the work roll, the strip is nipped under the action of friction. Then, after a short period of fluctuation rolling, the strip enters a stable rolling stage. Finally, a tail of the strip is moved out of the roll gap to complete the entire simulation rolling process.

In order to verify the accuracy and stability of the FEM, four strips of typical specifications were selected for rolling tests, and the accuracy was verified by the measured values and FEM values of the rolling force.

Figure 9:
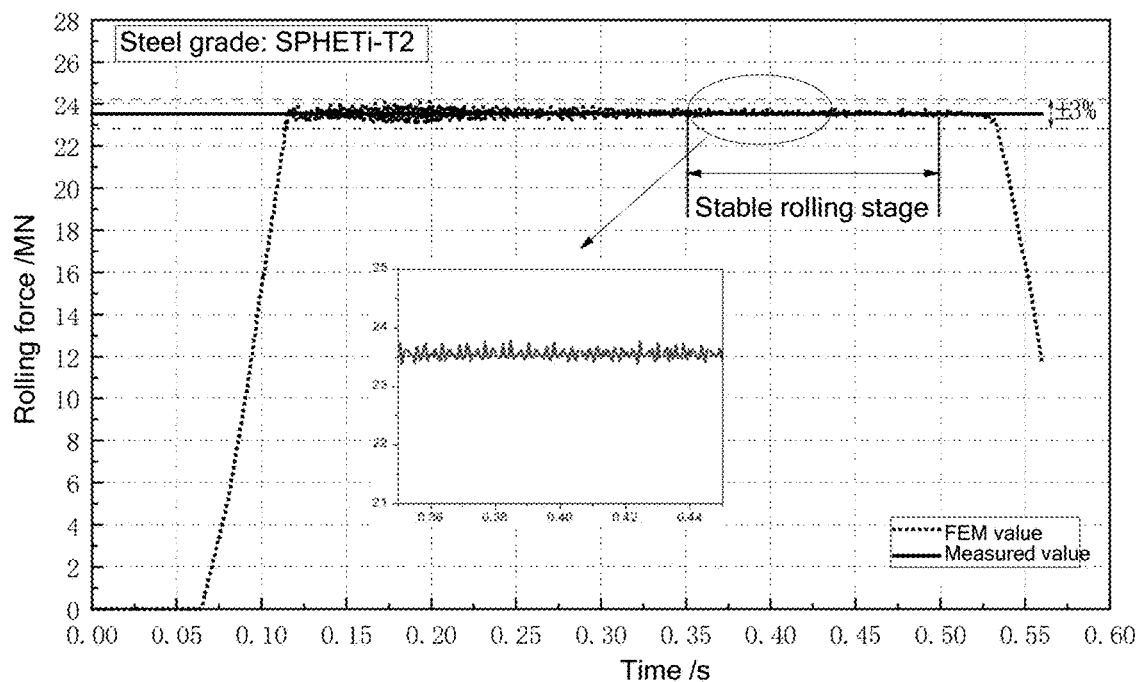
FIG. 9 shows a time history of a rolling force in an FEM according to a specific implementation of the present disclosure.
Figure 10:
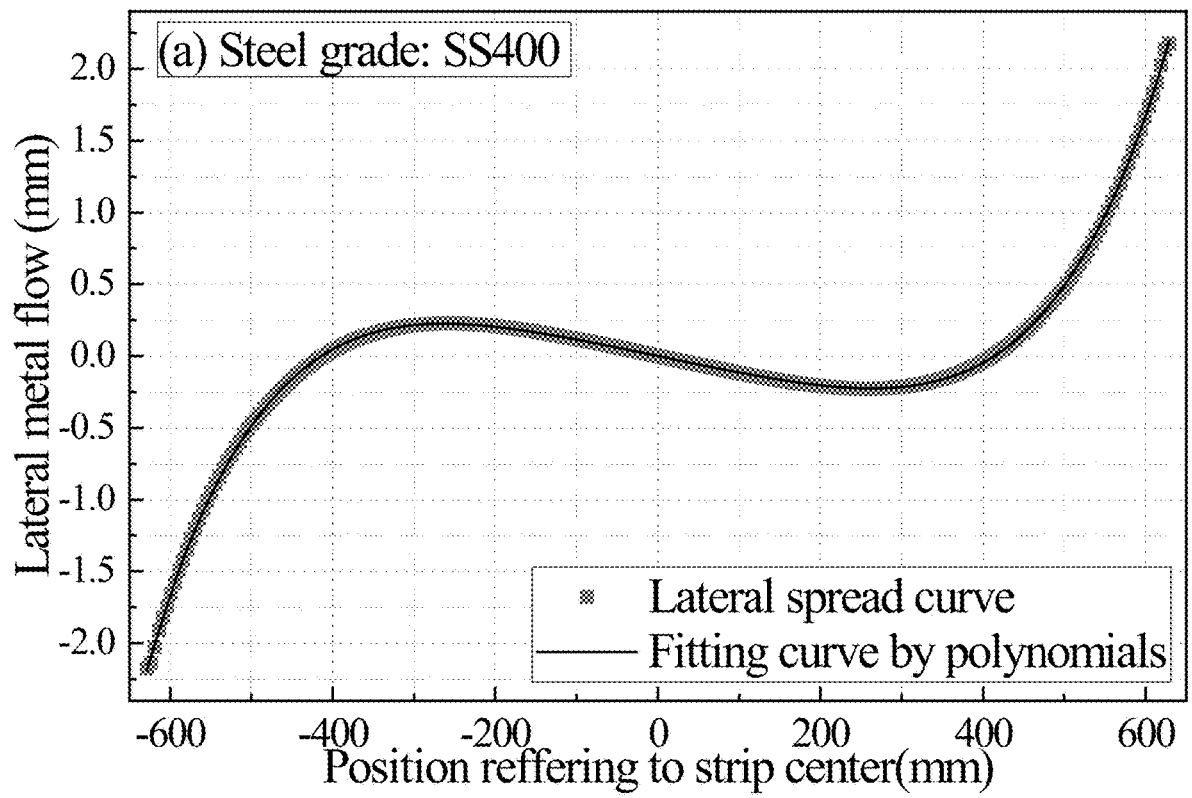
FIG. 10 shows a lateral metal flow curve for an SS400 strip according to a specific implementation of the present disclosure.
Figure 11:
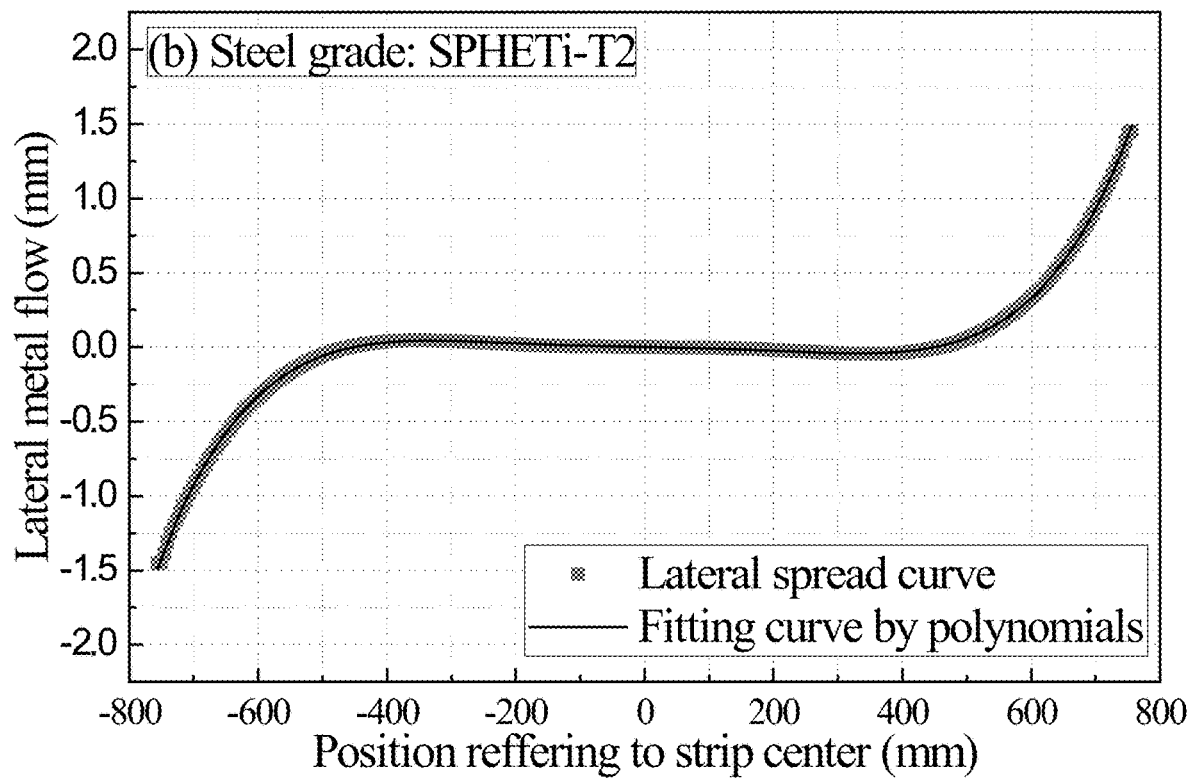
FIG. 11 shows a lateral metal flow curve for an SPHETi-T2 strip according to a specific implementation of the present disclosure.
Figure 12:
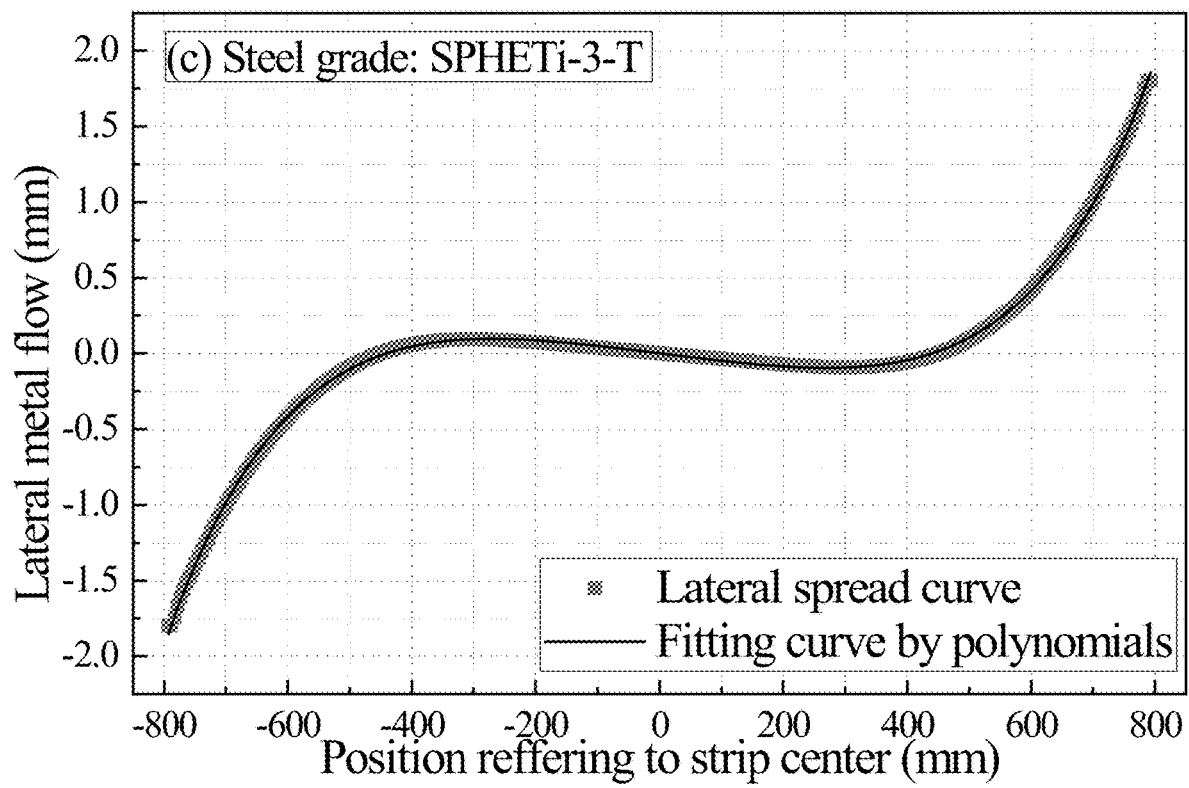
FIG. 12 shows a lateral metal flow curve for an SPHETi-3-T strip according to a specific implementation of the present disclosure.
Figure 13:
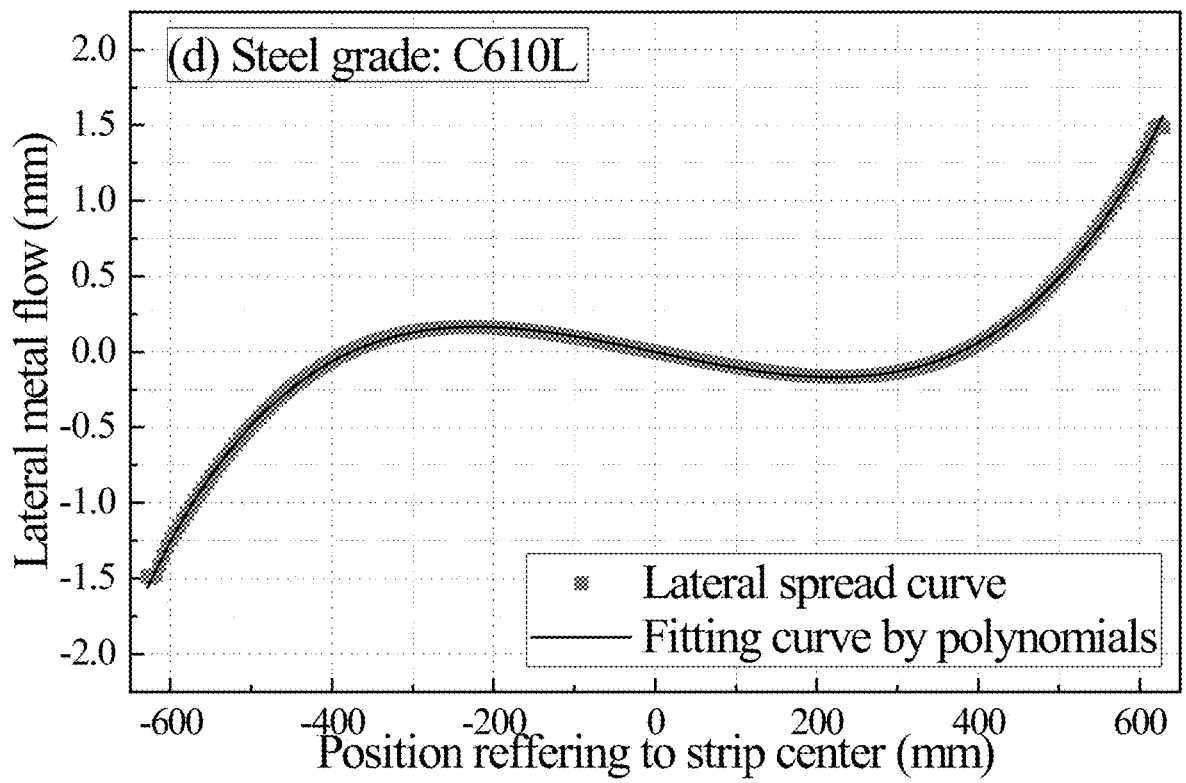
FIG. 13 shows a lateral metal flow curve for a C610L strip according to a specific implementation of the present disclosure.
Figure 14:
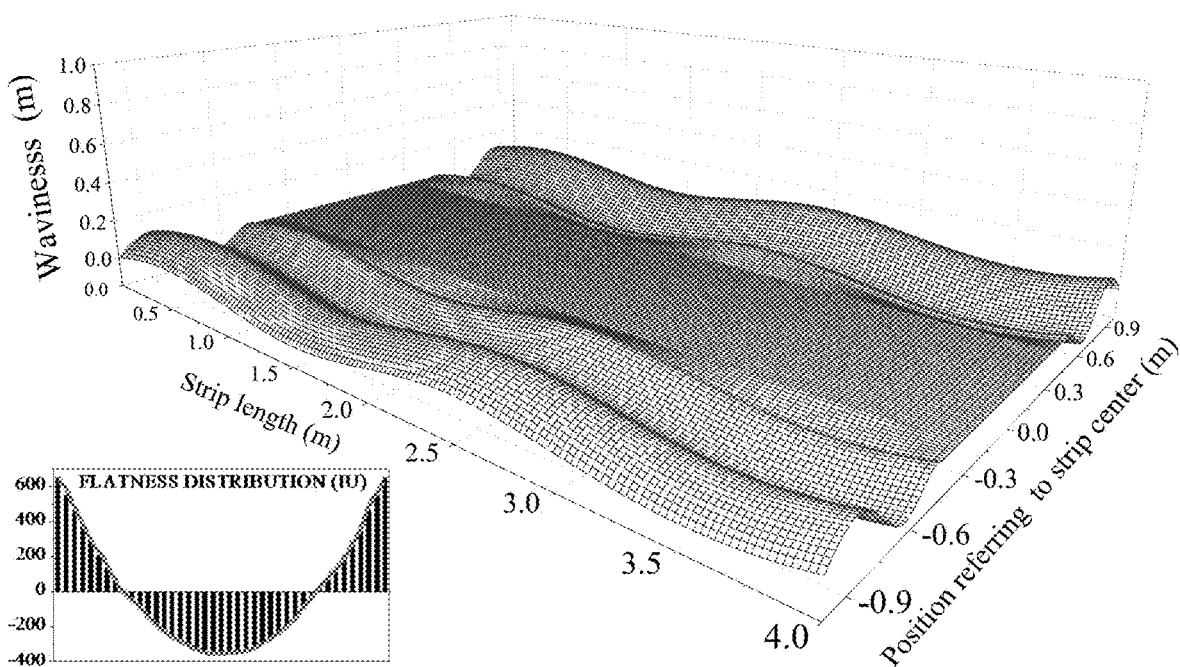
FIG. 14 shows edge waves according to a specific implementation of the present disclosure.
Figure 15:
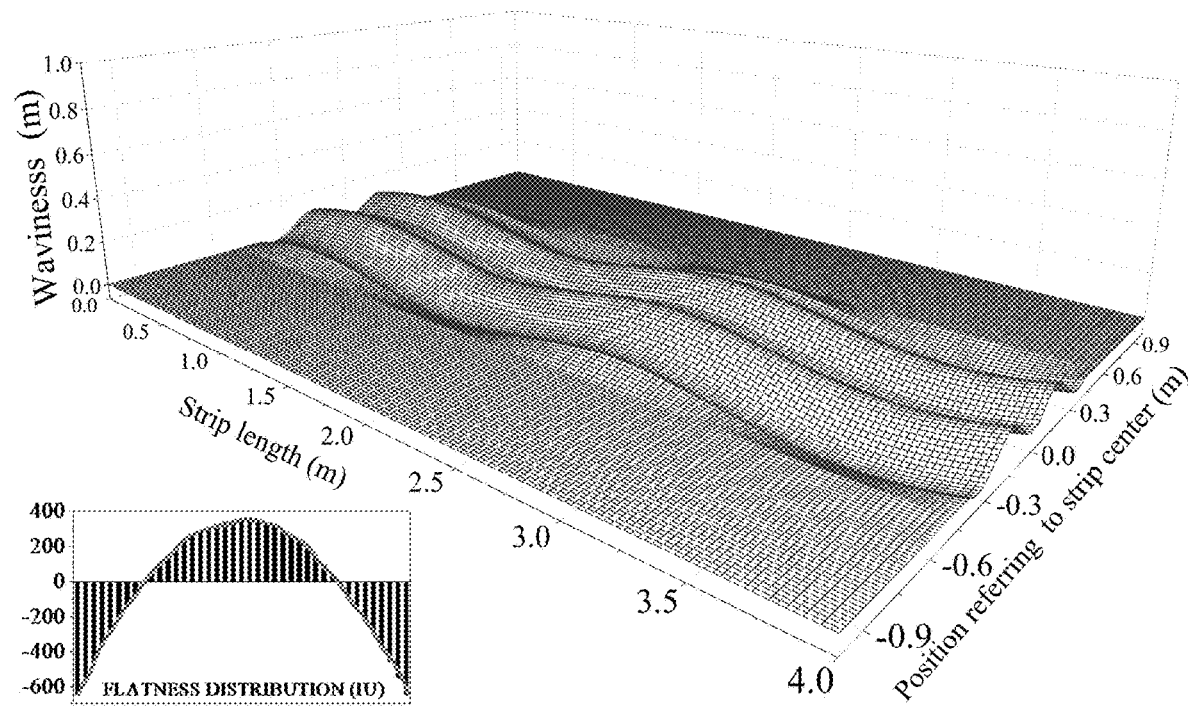
FIG. 15 shows center buckles according to a specific implementation of the present disclosure.
Figure 16:
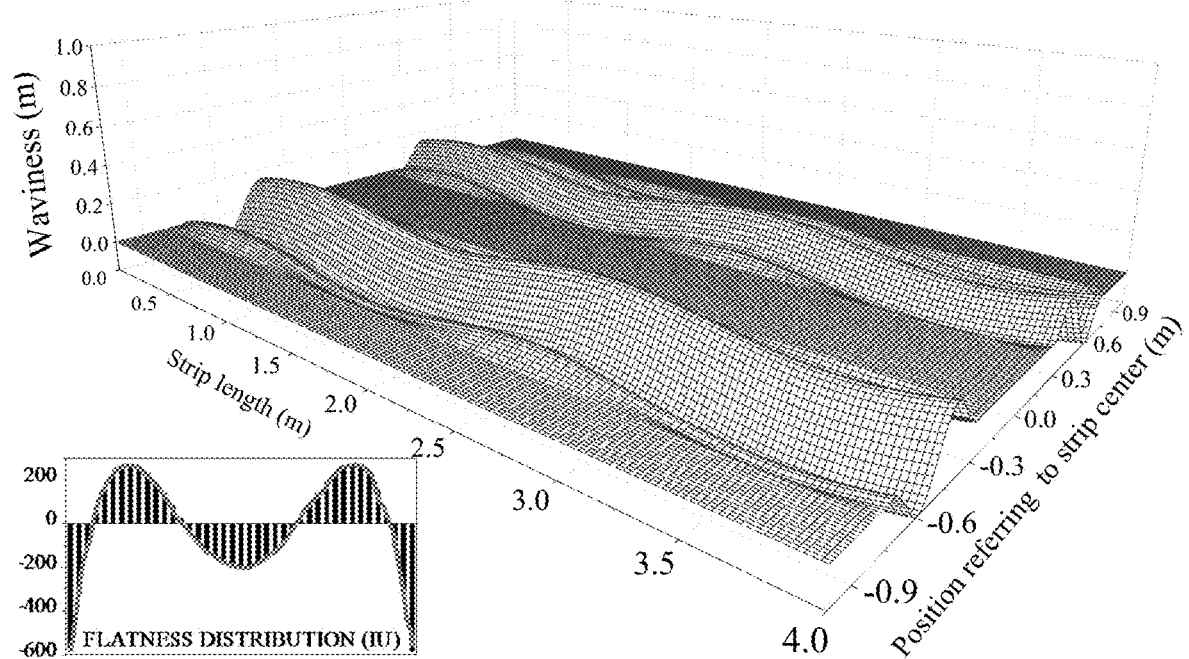
FIG. 16 shows M-shaped composite waves according to a specific implementation of the present disclosure.
Figure 17:
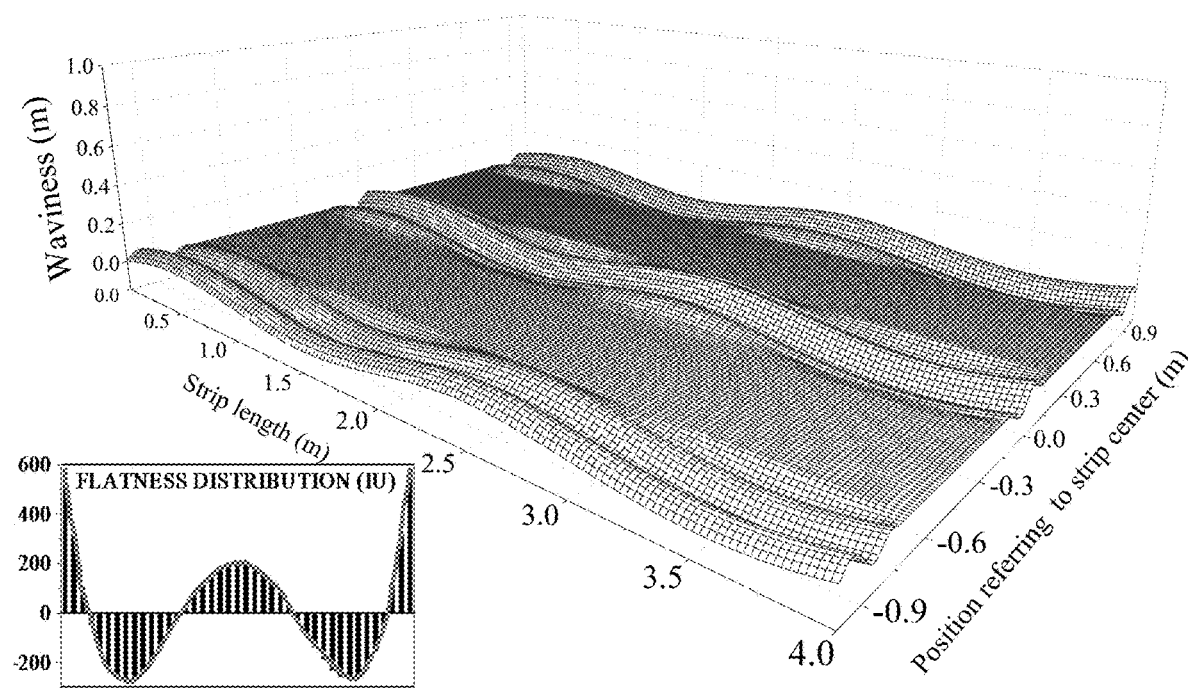
FIG. 17 shows edge W-shaped composite waves according to a specific implementation of the present disclosure.
Figure 18:
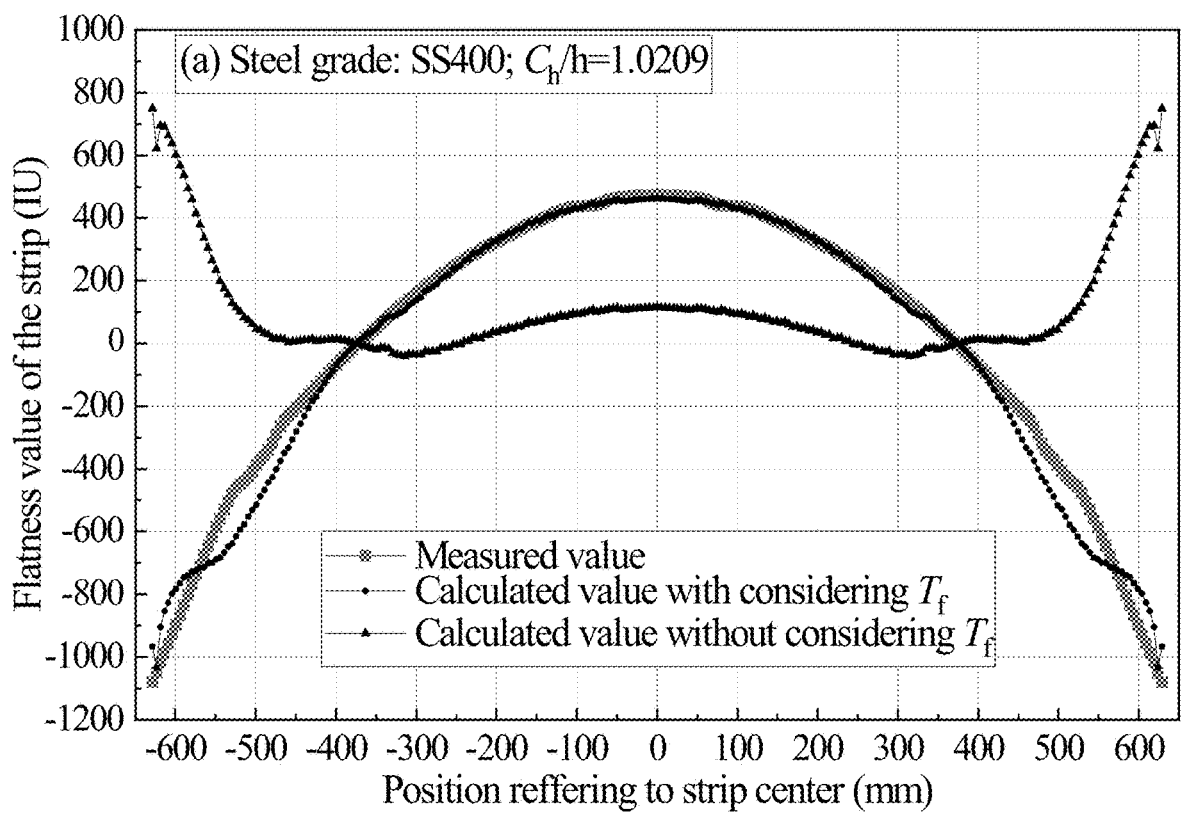
FIG. 18 shows a comparison of measured and predicted flatness distributions (predicted by different models) of an SS400 strip according to a specific implementation of the present disclosure.
Figure 19:
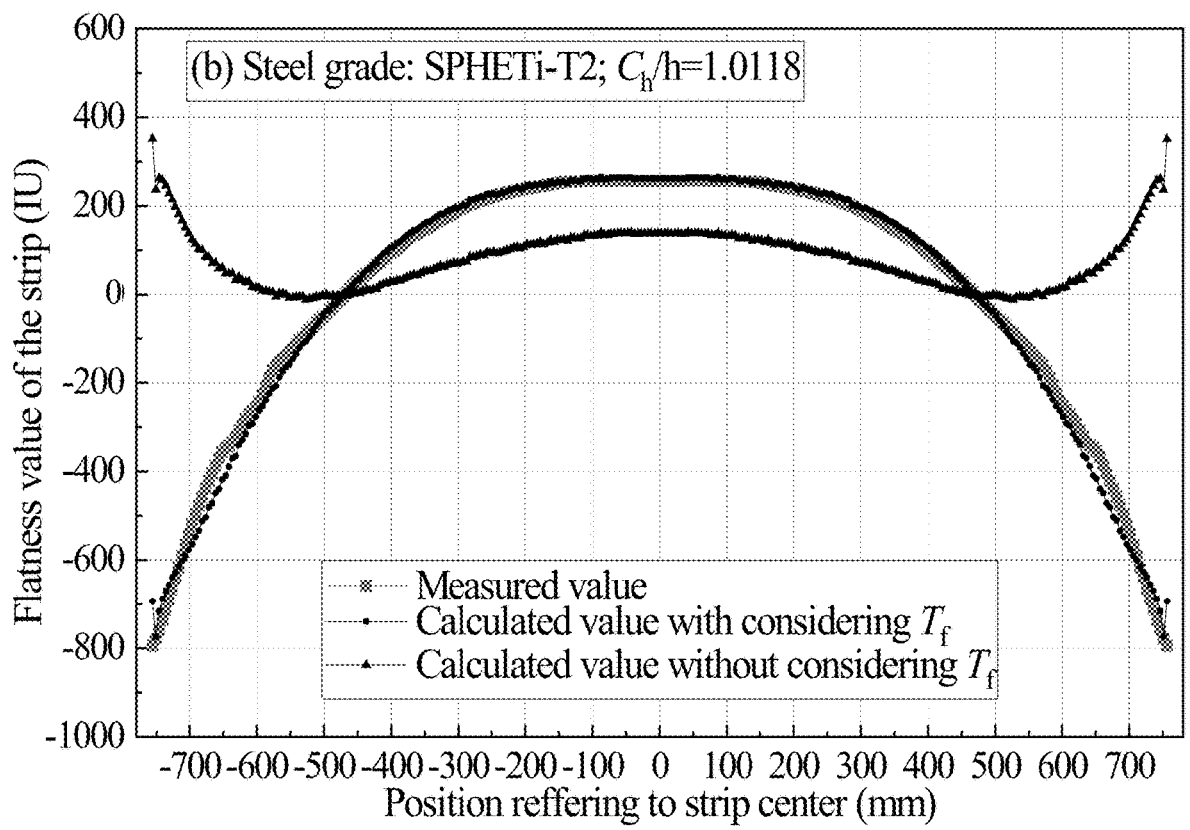
FIG. 19 shows a comparison of measured and predicted flatness distributions (predicted by different models) of an SPHETi-T2 strip according to a specific implementation of the present disclosure.
Figure 20:
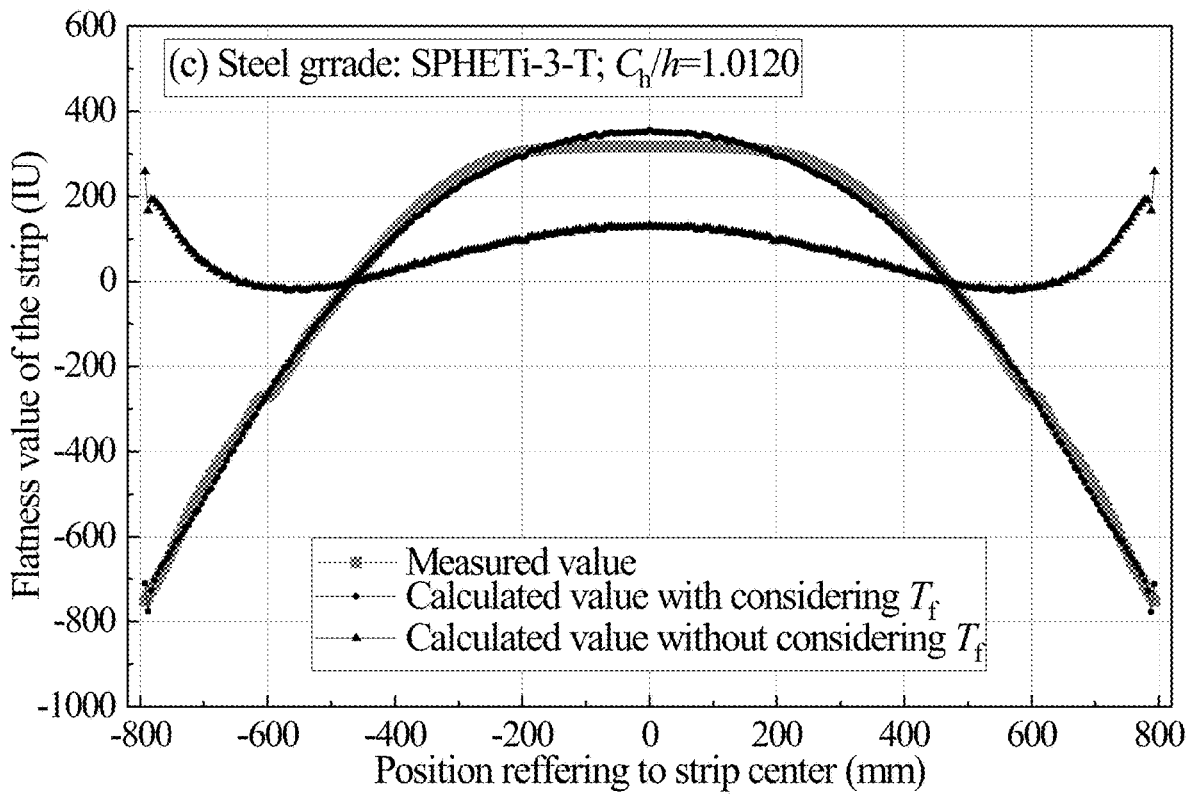
FIG. 20 shows a comparison of measured and predicted flatness distributions (predicted by different models) of an SPHETi-3-T strip according to a specific implementation of the present disclosure.
Figure 21:
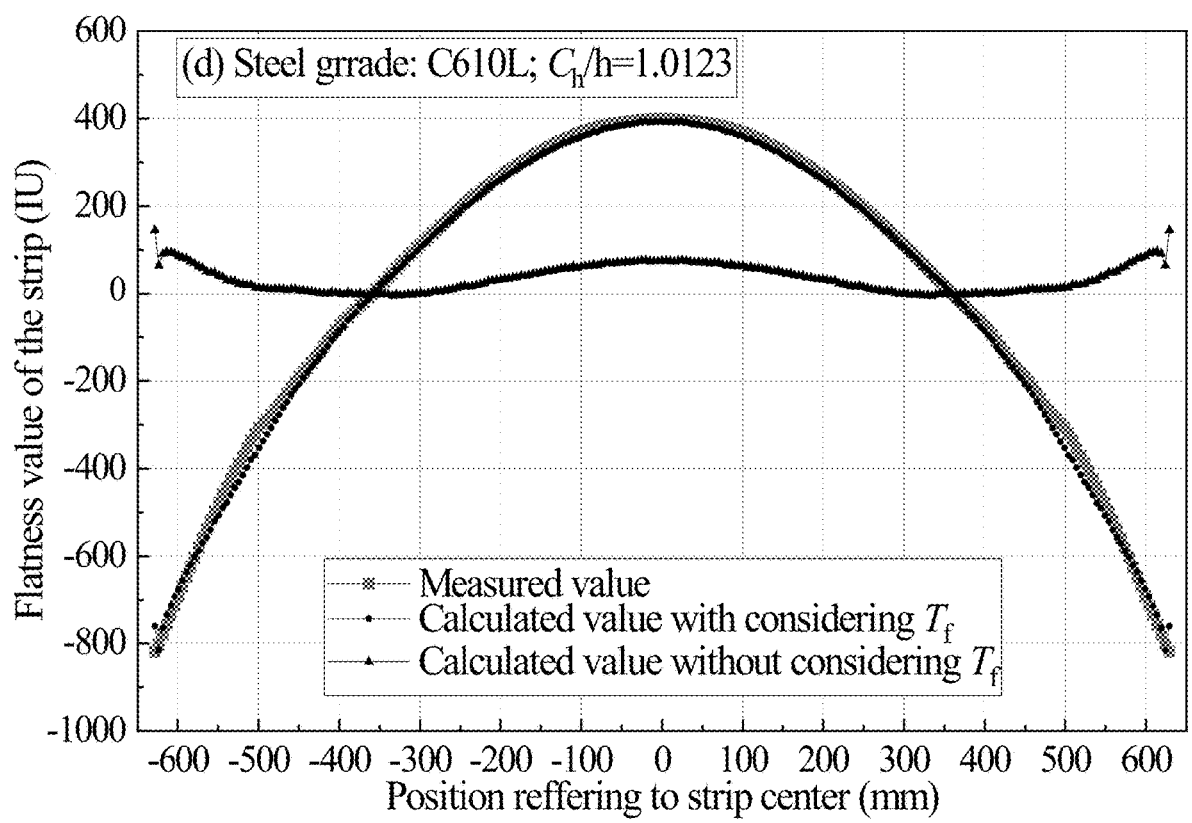
FIG. 21 shows a comparison of measured and predicted flatness distributions (predicted by different models) of a C610L strip according to a specific implementation of the present disclosure.

FIG. 9 shows a time history of the rolling force in the FEM. It can be seen from FIG. 9 that at first the rolling force fluctuates greatly when the strip nips into the roll gap, but gradually stabilizes as the rolling progresses, and its fluctuation range subsequently stabilizes within 3%. In the stable rolling stage indicated in FIG. 9, the rolling force is very stable and the fluctuation range is small, indicating that the model at this time has high stability. The rolling force data in the stable rolling stage shown in FIG. 9 is extracted, and the average value of the rolling force is calculated as an FEM value. Similarly, the lateral metal flow, flatness and thickness data of the strip in the stable rolling stage are extracted, and their average values are calculated to eliminate errors caused by accidental factors.

Table 2 shows a comparison between the rolling force actually measured in the field rolling test and the FEM value of the rolling force. The absolute value of the relative error between the FEM value of the rolling force and the measured value does not exceed 2.6%. The comparison results show that the FEM value of the rolling force is basically consistent with the measured value, and the error is small, indicating that the FEM has high calculation accuracy. In addition, the time history of the rolling force in FIG. 9 also shows that the FEM has good stability. Therefore, the FEM is used to simulate the rolling process of the strip, and its accuracy and stability fully meet the requirements for the mathematical model of strip flatness.

TABLE 2

| Steel grade | Yield strength (MPa) | Width (mm) | Thickness (mm) Inlet | Thickness (mm) Outlet | Rolling force (MN) Measured value | Rolling force (MN) FEM value | Relative error |
|---|---|---|---|---|---|---|---|
| SS400 | 169.242 | 1258.6 | 34.57 | 19.938 | 26.774 | 27.454 | 2.54% |
| SPHETi-T2 | 140.076 | 1512.3 | 38.645 | 25.361 | 23.522 | 23.556 | 0.14% |
| SPHETi-3-T | 127.692 | 1586.2 | 45.761 | 28.104 | 25.678 | 25.577 | −0.39% |
| C610L | 150.923 | 1257.9 | 50.800 | 34.352 | 22.133 | 21.584 | −2.48% |

Step 3.4: Draw a lateral metal flow curve of the strip by the lateral displacement data in the stable rolling stage, and fit the lateral displacement function of the strip by a quintic polynomial function based on the distribution characteristics of the lateral flow curve. FIGS. 10, 11, 12 and 13 show the lateral metal flow curves of SS400, SPHETi-T2, SPHETi-3-T and C610L strips respectively. The lateral flow of metal particles of the strip is unevenly distributed along the width direction, gradually intensifying from the center of the strip to the edges, and particularly intense in a deformation zone at both edges. With such a lateral flow trend of metal particles, the lateral metal flow curve of the strip exhibits a symmetric, inverted S-shaped distribution. The fitting equation of the lateral displacement function u(y) is as follows:

$$\begin{cases} u(y) = A_0 + A_1 \cdot y + A_2 \cdot y^2 + A_3 \cdot y^3 + A_4 \cdot y^4 + A_5 \cdot y^5 \\ u'(y) = A_1 + 2A_2 \cdot y + 3A_3 \cdot y^2 + 4A_4 \cdot y^3 + 5A_5 \cdot y^4 \end{cases} \quad (14)$$

In the equation, $A_0$, $A_1$, $A_2$, $A_3$, $A_4$, $A_5$ respectively represent a fitting coefficient of each item, and u'(y) represents a derivative function of the lateral displacement function u(y).

In this embodiment, the fitting results of the lateral metal flow curves by the quintic polynomial are shown in FIGS. 10 to 13 and Table 3. In Table 3, Adj. R-Square represents a degree of fit of the curve, which indicates a higher accuracy of the fitting result when being closer to 1. According to the fitting results in Table 3, for strips of different specifications and sizes, Adj. R-Square is above 0.999 and close to 1, indicating that the lateral metal flow curve of the strip is fitted with high accuracy by the quintic polynomial function. Therefore, the use of the quintic polynomial function to express the lateral displacement function of the strip is trustworthy, and fully meets the accuracy requirement of the research.

TABLE 3

| Steel grade | Adj. R-Square | $A_0$ | $A_1$ | $A_2$ | $A_3$ | $A_4$ | $A_5$ |
|---|---|---|---|---|---|---|---|
| SS400 | 0.9999 | $-9.5087 \cdot 10^{-6}$ | $-1.1760$ | $6.0302 \cdot 10^{-4}$ | $3.1182$ | $-1.7659 \cdot 10^{-3}$ | $2.1894 \cdot 10^{1}$ |
| SPHETi-T2 | 0.9998 | $-1.3224 \cdot 10^{-4}$ | $-8.3758 \cdot 10^{-2}$ | $4.5714 \cdot 10^{-5}$ | $-1.3388$ | $-1.0578 \cdot 10^{-3}$ | $8.6047$ |
| SPHETi-3-T | 0.9996 | $2.3419 \cdot 10^{-5}$ | $-5.0743 \cdot 10^{-1}$ | $5.6361 \cdot 10^{-5}$ | $1.7626$ | $3.1559 \cdot 10^{-3}$ | $4.3894$ |
| C610L | 0.9996 | $-3.0212 \cdot 10^{-5}$ | $-1.1140 \cdot 10^{-3}$ | $-1.7782 \cdot 10^{-10}$ | $7.1417 \cdot 10^{-9}$ | $1.4295 \cdot 10^{-15}$ | $4.9226 \cdot 10^{-15}$ |

Step 3.5: Calculate the lateral spread factor $T_f$ by the fitted lateral displacement function u(y) according to Eq. (7), and calculate the change factor $C_r$ of the lateral thickness difference before and after rolling by the thickness data in the stable rolling stage according to Eq. (6).

Step 4: Predict the flatness of the strip by the strip flatness prediction model based on the coupling of flatness, crown and lateral spread.

FIGS. 14, 15, 16 and 17 respectively show four types of strip flatness defects, namely edge waves, center buckles, M-shaped composite waves and W-shaped composite waves. FIGS. 18, 19, 20 and 21 respectively show three types of flatness distribution curves of SS400, SPHETi-T2, SPHETi-3-T and C610L strips, namely measured curves, predicted curves considering the lateral spread factor and predicted curves without considering the lateral spread factor.

It can be seen from FIGS. 18 to 21 that the measured curve almost completely coincides with the predicted curve considering the lateral spread factor. This indicates that the error between the flatness calculated by the strip flatness prediction model of the present disclosure and the actual measured flatness is very small, and the model has high accuracy and applicability. The reason is that the construction of the model does not ignore the lateral spread caused by lateral metal flow, and does not introduce too many assumptions. This model is suitable for the flatness calculation of strips of various specifications in the rolling process, and is not restricted by the strip's thickness and width to thickness ratio. The strip flatness prediction model shown in Eq. (13) can accurately calculate the strip flatness at any measuring point in the width direction, and qualitatively and quantitatively analyze the strip flatness distribution during the rolling process. In addition, this model can accurately predict the location of various strip flatness defects, not limited to the prediction and analysis of edge waves and center buckles.

Apparently, the above described embodiments are merely a part rather than all of the embodiments of the present disclosure. The above embodiments are merely intended to explain the present disclosure, rather than to limit the protection scope of the present disclosure. Any other embodiments obtained by those skilled in the art based on the above embodiments without creative efforts or any modifications and equivalent substitutions and improvements made based on the spirit and principles of the present disclosure should fall within the protection scope of the present disclosure.

What is claimed is:

1. A strip flatness prediction method considering lateral spread during rolling, comprising the following steps:
    step 1: acquiring strip parameters, roll parameters and rolling process parameters, wherein the strip parameters comprise strip width, thickness, crown ratio, density, elastic modulus, yield strength, Poisson's ratio and tangent modulus; the roll parameters comprise diameter, barrel length, density, elastic modulus and Poisson's ratio of a work roll; the rolling process parameters comprise friction and rolling speed;
    step 2: constructing a strip flatness prediction model based on coupling of flatness, crown and lateral spread by considering lateral metal flow;
    step 3: constructing a three-dimensional (3D) finite element model (FEM) of a rolling mill and a strip according to the strip parameters, the roll parameters and the rolling process parameters, simulating strip rolling by the 3D FEM, extracting lateral displacement and thickness data of the strip during a stable rolling stage, and calculating parameters of the strip flatness prediction model based on the coupling of flatness, crown and lateral spread; and
    step 4: predicting the flatness of the strip by the strip flatness prediction model based on the coupling of flatness, crown and lateral spread,
    wherein step 2 comprises the following steps:
    step 2.1: constructing a coordinate system for the strip by taking a center of the strip as an origin of coordinates and width, length and thickness directions as 3D coordinate axes; regarding the strip before rolling as an entity of continuous longitudinal fiber strips; taking a longitudinal fiber strip at a widthwise position with a distance y from a center of the strip, and defining width, thickness and length of the longitudinal fiber strip before rolling as dy, H(y) and L(y) respectively; increasing the width of the longitudinal fiber strip after rolling to dy+[u(y+dy)−u(y)], reducing the thickness of the longitudinal fiber strip after rolling to h(y), and increasing the length of the longitudinal fiber strip after rolling to l(y), by considering lateral flow of metal particles during the strip rolling, wherein u(y) represents a lateral displacement function of metal particles of the strip;

step 2.2: constructing the strip flatness prediction model based on the coupling of flatness, crown and lateral spread:

step 2.2.1: according to a principle of constant volume before and after rolling:

$$h(y) \cdot l(y) \cdot [dy+u(y+dy)-u(y)] = H(y) \cdot L(y) \cdot dy \quad (1)$$

deriving the length of the longitudinal fiber strip after rolling as:

$$l(y) = \frac{H(y) \cdot L(y) \cdot dy}{h(y) \cdot [dy + u(y+dy) - u(y)]} = \frac{H(y) \cdot L(y)}{h(y) \cdot [1 + u'(y)]} \quad (2)$$

where u'(y) represents a derivative function of the lateral displacement function u(y);

step 2.2.2: determining a reference length for all longitudinal fiber strips of the strip after rolling;

$$l(\bar{y}) = \frac{H(\bar{y}) \cdot L(\bar{y})}{h(\bar{y}) \cdot [1 + u'(\bar{y})]} \quad (3)$$

where $\bar{y}$ represents a distance of a reference longitudinal fiber strip from the center of the strip; $l(\bar{y})$ represents a length of the reference longitudinal fiber strip after rolling; $H(\bar{y})$ represents a thickness of the reference longitudinal fiber strip before rolling; $L(\bar{y})$ represents a length of the reference longitudinal fiber strip before rolling; $h(\bar{y})$ represents a thickness of the reference longitudinal fiber strip after rolling;

step 2.2.3: calculating a length ratio of any longitudinal fiber strip with the distance of y from the center of the strip to the reference longitudinal fiber strip after rolling:

$$\frac{l(y)}{l(\bar{y})} = \frac{\frac{H(y) \cdot L(y)}{h(y) \cdot [1 + u'(y)]}}{\frac{H(\bar{y}) \cdot L(\bar{y})}{h(\bar{y}) \cdot [1 + u'(\bar{y})]}} = \frac{L(y)}{L(\bar{y})} \cdot \frac{\frac{H(y)}{h(y)}}{\frac{H(\bar{y})}{h(\bar{y})}} \cdot \frac{1 + u'(\bar{y})}{1 + u'(y)} \quad (4)$$

$$= \frac{L(y)}{L(\bar{y})} \cdot \frac{1 - \frac{H(\bar{y}) - H(y)}{H(\bar{y})}}{1 - \frac{h(\bar{y}) - h(y)}{h(\bar{y})}} \cdot \frac{1 + u'(\bar{y})}{1 + u'(y)}$$

step 2.2.4: calculating a longitudinal strain of the longitudinal fiber strip with the distance of y from the center of the strip after rolling as $\varepsilon_{out}(y)$:

$$\varepsilon_{out}(y) = \frac{l(y) - l(\bar{y})}{l(\bar{y})} \quad (5)$$

$$= \frac{l(y)}{l(\bar{y})} - 1$$

$$= \frac{L(y)}{L(\bar{y})} \cdot \frac{1 - \frac{H(\bar{y}) - H(y)}{H(\bar{y})}}{1 - \frac{h(\bar{y}) - h(y)}{h(\bar{y})}} \cdot \frac{1 + u'(\bar{y})}{1 + u'(y)} - 1$$

$$= [\varepsilon_{in}(y) + 1] \cdot \frac{1 - \frac{H(\bar{y}) - H(y)}{H(\bar{y})}}{1 - \frac{h(\bar{y}) - h(y)}{h(\bar{y})}} \cdot \frac{1 + u'(\bar{y})}{1 + u'(y)} - 1$$

where $\varepsilon_{in}(y)$ represents a longitudinal strain before rolling, $$\varepsilon_{in}(y) = \frac{L(y)}{L(\bar{y})} - 1;$$

step 2.2.5: defining a change factor of a lateral thickness difference before and after rolling as $C_r$:

$$C_r = 1 - \frac{\frac{H(\bar{y}) - H(y)}{H(\bar{y})}}{1 - \frac{h(\bar{y}) - h(y)}{h(\bar{y})}} \quad (6)$$

defining a lateral spread factor as $T_f$:

$$T_f = \frac{1 + u'(\bar{y})}{1 + u'(y)} \quad (7)$$

obtaining the longitudinal strain of the longitudinal fiber strip after rolling as:

$$\varepsilon_{out}(y) = [\varepsilon_{in}(y)+1] \cdot C_r \cdot T_f - 1 \quad (8)$$

step 2.2.6: calculating an outlet flatness of the strip as $I_{out}(y)$:

$$I_{out}(y) = \varepsilon_{out}(y)/10^{-5} \quad (9)$$

step 2.2.7: calculating a total residual tensile stress by regarding an elastic deformation of the strip caused by a tension as a plane deformation as $\sigma_{xx\_total}^{out}(y)$:

$$\sigma_{xx\_total}^{out}(y) = \bar{\sigma}_{out} + \sigma_{xx}^{out}(y) \quad (10)$$

where $\bar{\sigma}_{out}$ represents an outlet reference tensile stress, and $\sigma_{xx}^{out}(y)$ represents a longitudinal residual tensile stress caused by an uneven extension of the longitudinal fiber;

$$\sigma_{xx}^{out}(y) = -\frac{E}{1 - v^2} \varepsilon_{out}(y) \quad (11)$$

then $$\sigma_{xx\_total}^{out}(y) = \bar{\sigma}_{out} - \frac{E}{1 - v^2} \varepsilon_{out}(y) \quad (12)$$

where E and ν respectively represent the elastic modulus and Poisson's ratio of the strip;

step 2.2.8: obtaining the strip flatness prediction model based on the coupling of flatness, crown and lateral spread as:

$$I_{out}(y) = \{[I_{in}(y) \cdot 10^{-5} + 1] \cdot C_r \cdot T_f - 1\}/10^{-5} \quad (13)$$

$$\sigma_{xx\_total}^{out}(y) = \bar{\sigma}_{out} - \frac{E}{1-\nu^2}\{[I_{in}(y) \cdot 10^{-5} + 1] \cdot C_r \cdot T_f - 1\}$$

where $I_{in}(y)$ represents an inlet flatness of the strip.

2. The strip flatness prediction method considering lateral spread during rolling according to claim 1, wherein step 3 comprises the following steps:

step 3.1: making an assumption and simplification in an FE modeling process: assuming that the rolling mill and the strip are completely symmetrical about a rolling center plane, and constructing only a simplified ½ model about an upper part of the work roll and half of the strip; ignoring an elastic deformation of the work roll, setting the work roll as a rigid material, and controlling an outlet cross-sectional shape and crown of the strip by changing a shape of a profile curve of the work roll; regarding a strip material as isotropic in the 3D FEM, and simulating a stress-strain behavior of the strip during deformation by using a bilinear elastoplastic isotropic hardening material model; modeling a length of strip instead of a coil of strip in the 3D FEM;

step 3.2: constructing the 3D FEM model of the rolling mill and the strip: constructing the 3D FEM model of the rolling mill and the strip by using a non-linear FE analysis program LS-DYNA according to the strip parameters, the roll parameters and the rolling process parameters, compiling an FE simulation program of the rolling mill and the strip by using ANSYS parametric design language (APDL), and compiling the FE simulation program into a macro file;

step 3.3: setting an inlet crown ratio and an outlet crown ratio of the strip to 1%, simulating the strip rolling by the 3D FEM, extracting rolling force data during the simulation process, regarding a stage where a rolling force fluctuation is lower than a % as the stable rolling stage, and extracting the lateral displacement, flatness and thickness data of the strip during the stable rolling stage;

step 3.4: drawing a lateral metal flow curve of the strip by the lateral displacement data in the stable rolling stage, and fitting the lateral displacement function u(y) of the strip by a quintic polynomial function:

$$\begin{cases} u(y) = A_0 + A_1 \cdot y + A_2 \cdot y^2 + A_3 \cdot y^3 + A_4 \cdot y^4 + A_5 \cdot y^5 \\ u'(y) = A_1 + 2A_2 \cdot y + 3A_3 \cdot y^2 + 4A_4 \cdot y^3 + 5A_5 \cdot y^4 \end{cases} \quad (14)$$

wherein, $A_0$, $A_1$, $A_2$, $A_3$, $A_4$, $A_5$ respectively represent a fitting coefficient of each item, and u'(y) represents a derivative function of the lateral displacement function u(y);

step 3.5: calculating the lateral spread factor $T_f$ by the fitted lateral displacement function u(y) according to Eq. (7), and calculating the change factor $C_r$ of the lateral thickness difference before and after rolling by the thickness data in the stable rolling stage according to Eq. (6).

* * * * *